United States Patent
Jha et al.

(10) Patent No.: US 10,604,275 B2
(45) Date of Patent: Mar. 31, 2020

(54) EXTERIOR AIRCRAFT LIGHT UNIT

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/975,975

(22) Filed: May 10, 2018

(65) Prior Publication Data

US 2018/0334265 A1    Nov. 22, 2018

(30) Foreign Application Priority Data

May 19, 2017   (EP) .................................. 17172033

(51) Int. Cl.
| | | |
|---|---|---|
| *B64D 47/04* | (2006.01) | |
| *B64D 47/06* | (2006.01) | |
| *F21V 29/74* | (2015.01) | |
| *F21S 45/48* | (2018.01) | |

(52) U.S. Cl.
CPC ............ *B64D 47/06* (2013.01); *B64D 47/04* (2013.01); *F21S 45/48* (2018.01); *F21V 29/74* (2015.01); *B23P 2700/10* (2013.01); *B64D 2203/00* (2013.01)

(58) Field of Classification Search
CPC ......... B64D 47/06; B64D 47/04; F21V 29/74; F21V 29/763; F21S 45/48
See application file for complete search history.

(56) References Cited

U.S. PATENT DOCUMENTS

| | | |
|---|---|---|
| 5,247,734 A | 9/1993 | Lubbe et al. |
| 7,434,970 B2 | 10/2008 | Machi et al. |
| 2006/0181894 A1* | 8/2006 | Chinniah ................ F21V 31/03 362/547 |
| 2011/0277978 A1 | 11/2011 | Lai |
| 2012/0026737 A1 | 2/2012 | Dinc et al. |
| 2012/0195054 A1 | 8/2012 | Breidenassel et al. |
| 2013/0105132 A1 | 5/2013 | Huang |
| 2013/0221846 A1* | 8/2013 | Alexiou .................. F21V 29/75 315/51 |
| 2013/0249375 A1 | 9/2013 | Panagotacos et al. |

(Continued)

FOREIGN PATENT DOCUMENTS

| | | | |
|---|---|---|---|
| EP | 2767757 A1 | 8/2014 | |
| WO | WO-2012175263 A1 * | 12/2012 | ............ F21V 29/004 |
| WO | 2016151441 A1 | 9/2016 | |

OTHER PUBLICATIONS

European Search Report for Applicaiton No. 17172033.7-1754 dated Aug. 10, 2017, 11 pages.

*Primary Examiner* — Anabel Ton
(74) *Attorney, Agent, or Firm* — Cantor Colburn LLP (57) ABSTRACT

An exterior aircraft light unit comprises a housing, at least one light source, and a heat sink. The heat sink includes at least one first heat sink portion and at least one second heat sink portion. The at least one light source is thermal connected with the at least one first heat sink portion for transferring heat from the at least one light source to the at least one first heat sink portion; and the at least one second heat sink portion is configured to be selectively attachable to the at least one first heat sink portion.

20 Claims, 4 Drawing Sheets

(56) References Cited

U.S. PATENT DOCUMENTS

2015/0062909 A1  3/2015  Progl et al.
2015/0377452 A1  12/2015  Walesa
2016/0081225 A1  3/2016  Taketomi et al.
2016/0347474 A1* 12/2016  Millet ...................... G08G 5/02

* cited by examiner

EXTERIOR AIRCRAFT LIGHT UNIT

FOREIGN PRIORITY

This application claims priority to European Patent Application No. 17172033.7 filed May 19, 2017, the entire contents of which is incorporated herein by reference.

TECHNICAL FIELD

The present invention relates to an exterior aircraft light unit comprising a heat sink, in particular a heat sink in thermal connection with one or more light sources.

BACKGROUND

Almost all aircraft are equipped with exterior aircraft light units. In particular, large passenger air planes have a wide variety of exterior aircraft light units. Examples include a landing light unit, a take-off light unit, a taxi light unit, a runway turn-off light unit and a multi-functional light unit providing at least two of these functionalities.

Exterior aircraft light units may be provided with at least one heat sink for dissipating the heat generated by operating the light unit. The power requirements and space envelopes of each of these light units may vary as a function of external parameters which include the type of the aircraft, the respective position of installation of the light unit, such as a wing, a gear or the fuselage of the aircraft. Increased power requirements of the light unit result in an increased need for heat dissipation. This requires a larger heat sink providing more power dissipating ("cooling") capacity. Larger heat sinks, however, need more space for installation, which might not be available in every configuration and/or mounting position.

It therefore would be beneficial to provide an exterior aircraft light unit that is usable in a variety of different application scenarios.

SUMMARY

Exemplary embodiments of the invention include an exterior aircraft light unit comprising a housing, at least one light source and a heat sink. The housing has a mounting portion, which is configured for mounting the aircraft light unit to an aircraft, in particular to a wing, a gear or the fuselage of the aircraft. The heat sink comprises at least one first heat sink portion, which may be fixable to or integrally formed with the housing of the aircraft light unit. The at least one light source is arranged within the housing and thermally connected to the at least one first heat sink portion in order to allow transferring heat from the at least one light source to the at least one first heat sink portion. The heat sink further comprises at least one second heat sink portion, which is configured to be selectively attachable to the at least one first heat sink portion in a manner which allows heat to transfer from the at least one first heat sink portion to the at least one second heat sink portion. As a result, attaching the second heat sink portion to the first heat sink portion increases the cooling capacity of the heat sink allowing for a greater transfer of heat from the at least one light source than just with just the first heat sink portion alone.

Exemplary embodiments of the invention also include a set comprising a housing of an exterior aircraft light unit and a first heat sink portion. The housing comprises a mounting portion, which is configured for mounting the aircraft light unit to an aircraft, in particular to a wing, a gear or the fuselage of the aircraft. The housing is configured to accommodate at least one light source in a configuration in which the at least one light source is thermally connected with the at least one first heat sink portion for allowing heat to transfer from the at least one light source to the at least one first heat sink portion. The set further includes at least one second heat sink portion, which is configured to be selectively attachable to the at least one first heat sink portion for increasing the cooling capacity of the heat sink. The at least one second heat sink portion is attachable to the at least one first heat sink portion in a manner which allows heat to transfer from the at least one first heat sink portion to the second heat sink portion.

Exemplary embodiments of the invention also include an aircraft light unit comprising: a housing, at least one light source, a first heat sink portion in operable communication with the housing and the at least one light source configured to transfer heat from the at least one light source, the aircraft light unit being configured to allow a second heat sink portion to be attached to the aircraft light unit to allow for greater transfer of heat from the at least one light source than is possible with just the first heat sink portion alone. The second heat sink portion may be attachable to the aircraft light unit with no additional parts needed beyond those used to assemble the aircraft light unit with only the first heat sink portion attached.

Exemplary embodiments of the invention further include an aircraft, in particular an airplane or a helicopter, which comprises at least one exterior aircraft light unit according to an exemplary embodiment of the invention.

According to exemplary embodiments of the invention, the cooling capacity of the heat sink may be adjusted by selectively attaching or not attaching at least one second heat sink portion to the at least one first heat sink portion. The heat sink of the exterior aircraft light unit has a variable cooling capacity, i.e. a cooling capacity which may be adjusted to the actual needs. Such an exterior aircraft light unit allows for adjusting the cooling capacity and the corresponding size of the heat sink to the respective needs. It in particular allows for reaching a low size of the heat sink and thus of the whole exterior aircraft light unit, while still providing the necessary cooling capacity.

If the at least one second heat sink portion is attached to the at least one first heat sink portion, the cooling surface and the volume of the heat sink are increased by the surface and the volume of the at least one second heat sink portion, respectively.

Thus, in the case only a relatively low cooling capacity is required, and the space, which is available for accommodating the heat sink, is restricted, the size of the heat sink may be kept small by not attaching a second heat sink portion to the at least one first heat sink portion. In case sufficient space is available, the second heat sink portion may be attached later in case the user desires to upgrade the performance of the light unit by increasing the electrical power.

There may be provided a selection of second heat sink portions having different sizes. Provided a selection of second heat sink portions allows adjusting the cooling capacity very closely to the actual needs by selecting and mounting the most appropriate second heat sink portion, i.e. a second heat sink portion having a size which matches the respective cooling requirements as closely as possible. Alternatively or additionally, more than one second heat sink portion may be attached to the at least one first heat sink portion in order to increase the cooling capacity even further.

In an embodiment, the second heat sink portion is attachable to the aircraft light unit with no additional parts needed beyond those used to assemble the aircraft light unit with only the first heat sink portion attached. This allows for an easy and convenient installation of the second heat sink portion. In particular, no additional fasteners may be needed. The same fasteners can be used with and without the second heat sink portion. The fasteners may have the additional length that is needed for mounting the second heat sink portion.

In an embodiment, the at least one first heat sink portion comprises a plurality of first cooling ribs, which allow for an effective transfer of heat from the at least one first heat sink portion to the environment of the at least one first heat sink portion.

In an embodiment, the at least one second heat sink portion comprises a plurality of channels or grooves which are configured for receiving corresponding first cooling ribs, respectively. Such channels or grooves allow to attach the at least one second heat sink portion conveniently and reliably to the at least one first heat sink portion by introducing the first cooling ribs of the at least one first heat sink portion into the channels or grooves formed within the at least one second heat sink portion.

In an embodiment, at least some of the first cooling ribs and the corresponding channels or grooves of the at least one second heat sink portion are tapered in order to allow for a secure physical contact and heat transfer between the first and second heat sink portions. Tapering the ribs, channels and/or grooves in particular allows for compensating manufacturing tolerances.

In an embodiment, the at least one second heat sink portion comprises a plurality of second cooling ribs for providing an effective transfer of heat from the at least one second heat sink portion to the environment. Additionally, an additional second heat sink portion may be attached (stacked) to the second cooling ribs for increasing the cooling capacity of the heat sink even further.

In an embodiment, the first and/or second cooling ribs extend parallel to each other. In an embodiment, each channel or groove formed within the at least one second heat sink portion is associated with a corresponding second cooling rib. This configuration allows to form the channels or grooves so that they extend into the second cooling ribs, which results in a very efficient and light-weight configuration of the at least one second heat sink portion.

In an embodiment, the cooling ribs extend across an outer support ring. This results in a very efficient and light-weight configuration of the respective heat sink portion. It further allows to mount to the housing of the exterior aircraft light unit easily.

In an embodiment, the outer support ring is at least partly flexible which allows to compensate for manufacturing tolerances.

In an embodiment, the first cooling ribs have a height of 5 mm to 10 mm, in particular a height in the range of 6 mm to 8 mm, more particular a height of 7.5 mm. In an embodiment, the combined height of the first and second cooling ribs is in the range of 30 mm to 50 mm; in particular in the range of 35 mm to 45 mm, and more particular the combined height is 45 mm.

Cooling ribs having such heights provide suitable cooling capacities. First and second heat sink portions having such ribs are convenient to handle and to attach to the housings of exterior aircraft light units.

In an embodiment, at least one of the first and second heat sink portions is die-casted or machined from an extruded metal having a high thermal conductivity, such as Aluminum.

In an embodiment, the at least one light source and the at least one first heat sink portion of the heat sink are attached to a common support, in particular to a printed circuit board. The at least one first heat sink portion in particular may be attached to a first side of the common support/printed circuit board, whereas the at least one light source may be attached to an opposing second side of the common support/printed circuit board. Mounting the at least one light source and the at least one first heat sink portion to a common support allows for an effective transfer of heat from the at least one light source to the at least one first heat sink portion.

In an embodiment, the heat sink is arranged on a light emitting front side of the aircraft light unit. This allows to mount the at least one first heat sink portion to a front-side of a support/printed circuit board supporting the at least one light source on an opposing back-side. The at least one light source may face at least one reflector, which is provided opposite to the at least one light source on the back-side of the support/printed circuit board. Such a configuration results in an exterior aircraft light unit having a compact structure and providing an efficient transfer of heat from the at least one light source to the at least one first heat sink portion.

In an embodiment, the first and/or second cooling ribs extend parallel to a direction of main light emission of the exterior aircraft light unit for minimizing the obstructing of the light emission caused by the cooling ribs.

In an embodiment, the heat sink is arranged on a no light emitting rear side of the aircraft light unit, in particular on a back-side of a support/printed circuit board supporting the at least one light source and/or a reflector.

In an embodiment, the at least one light source is at least one LED. In particular, the exterior aircraft light unit may comprise a plurality of light sources, in particular a plurality of LEDs.

In an embodiment, the exterior aircraft light unit is an exterior aircraft light unit having an electrical power of more than 10 W, in particular an electrical power in the range of 10 W to 500 W, more particular an electrical power in the range of 50 W to 250 W. A heat sink according to exemplary embodiments of the invention is particularly effective for exterior aircraft light units operating in these power ranges.

In an embodiment, the exterior aircraft light unit is at least one of a landing light unit, a take-off light unit, a taxi light unit, a runway turn-off light unit and a multi-functional light unit providing at least two of the functionalities of a landing light unit, a take-off light unit, a taxi light unit, and a runway turn-off light unit.

These light unit are usually operated with high electrical power, in particular an electrical power in the range of 10 W to 500 W, more particularly an electrical power in the range of 50 W to 250 W. Thus, the use of a heat sink according to exemplary embodiments of the invention is particularly effective for these kinds of exterior aircraft light units.

BRIEF DESCRIPTION OF THE DRAWINGS

An exterior aircraft light unit and a heat sink according to exemplary embodiments of the invention are described in more detail below with reference to the enclosed figures.

DETAILED DESCRIPTION

Figure 1:
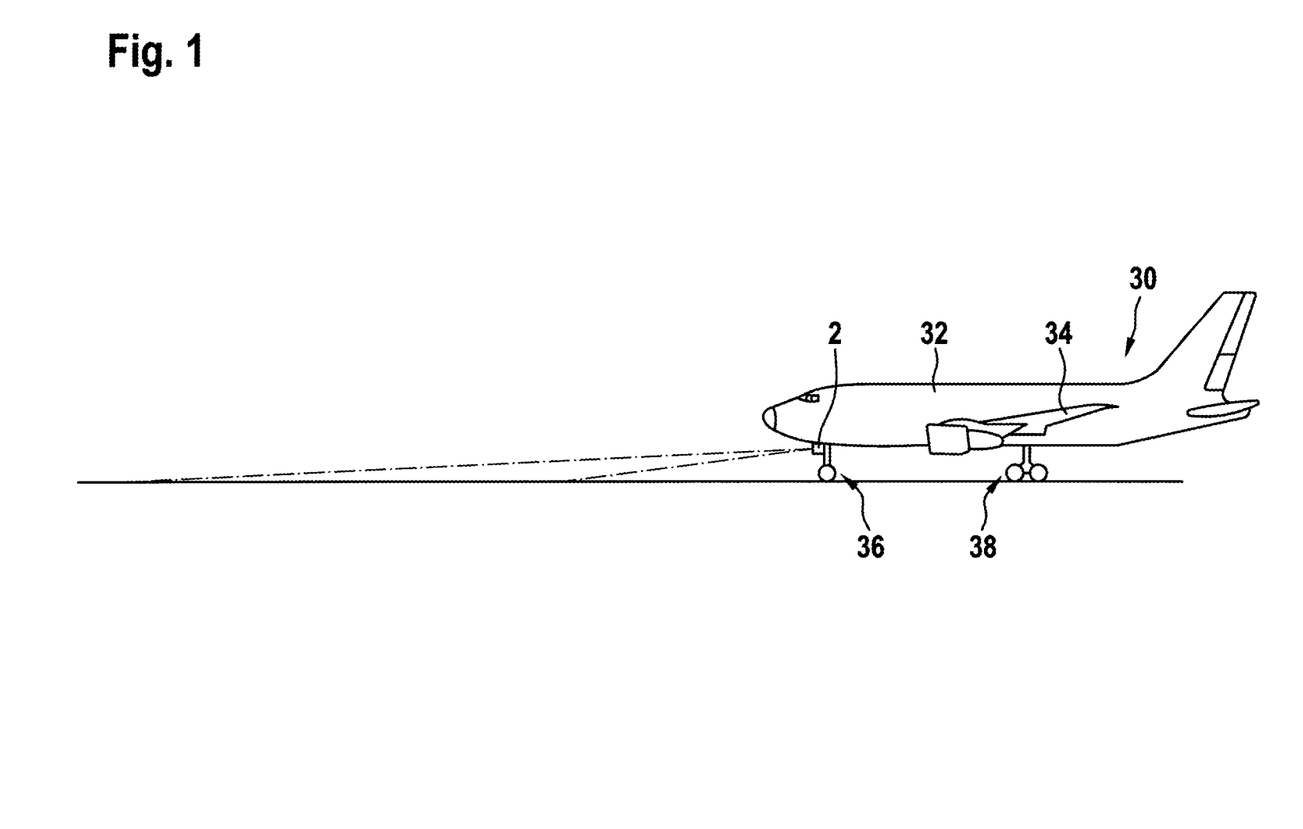
FIG. 1 shows an airplane 30 comprising an exterior aircraft light unit 2 according to an exemplary embodiment of the invention.

FIG. 1 depicts an airplane 30 comprising an exterior aircraft light unit 2 according to an exemplary embodiment of the invention which is mounted to a front running gear 36 of the airplane 30. Alternatively, the exterior aircraft light unit 2 may be mounted to the fuselage 32, a wing 34 or a main running gear 38 of the airplane 30.

Figure 2:
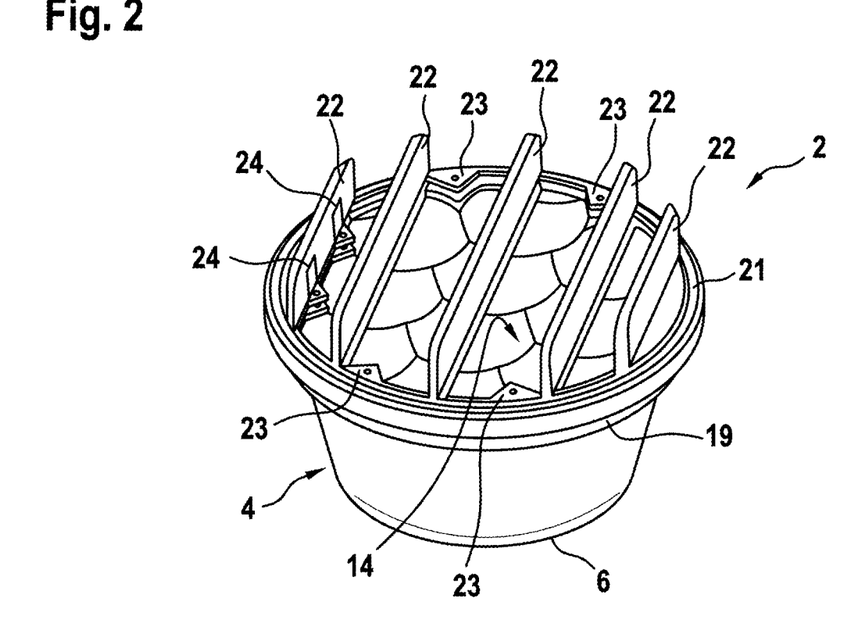
FIG. 2 shows a perspective view of an exterior aircraft light unit according to an exemplary embodiment of the invention.
Figure 3:
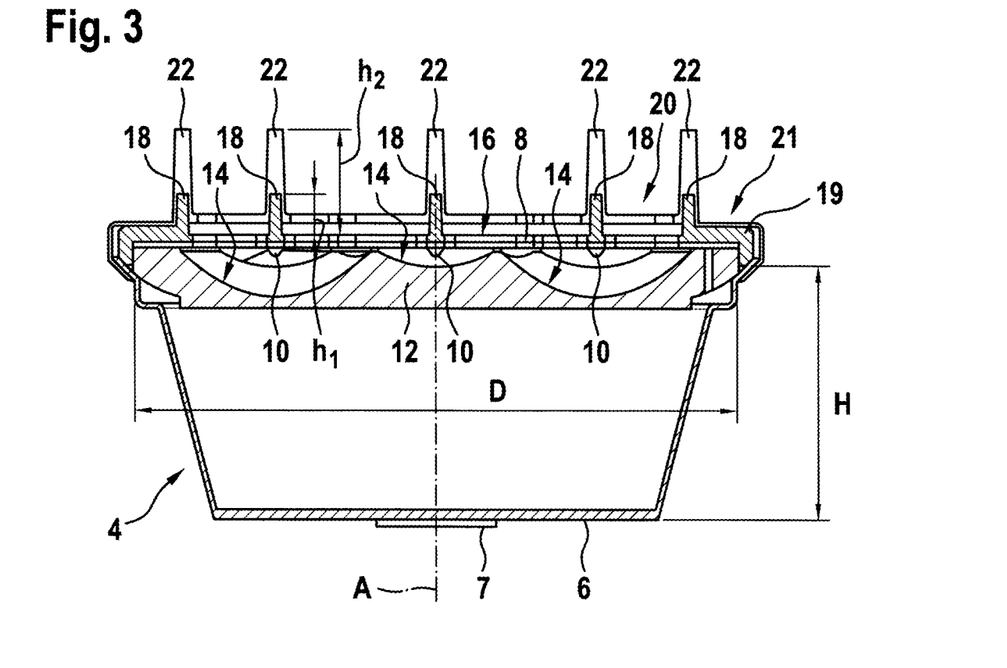
FIG. 3 shows a sectional view of the exterior aircraft light unit shown in FIG. 2.

FIG. 2 a shows a perspective view of an exterior aircraft light unit 2 according to an exemplary embodiment of the invention, and FIG. 3 shows a sectional view thereof.

The exterior aircraft light unit 2 comprises a cup-shaped housing 4 having a rear wall 6, which is shown at the bottom of FIGS. 1 and 2. The rear wall 6 comprises a mounting portion 7 (not shown in FIG. 2), which is configured for mounting the housing 4 to an aircraft 30, e.g. to the fuselage 32, a wing 34 or a running gear 36, 38 of the airplane 30 (cf. FIG. 1).

The housing 4 may be have a cylindrical shape around an axis A. Alternatively, the housing 4 may have a conical shape, as it is shown in FIGS. 2 and 3. The skilled person will understand that other geometrical shapes of the housing 4 are possible as well.

The cup-shaped housing 4 may have a maximum diameter D of 150 mm to 250 mm, in particular a maximum diameter D of 175 mm to 225 mm, more particularly a maximum diameter D of 210 mm.

The height H of the housing may be in the range of 50 mm to 250 mm, in particular in the range of 175 mm to 225 mm, more particularly close to 210 mm.

A support plate 8 is provided at the open front side of the housing 4, i.e. at the side opposite to the rear wall 6. The support plate 8, which in particular may be a printed circuit board (PCB), supports electrical light sources 10, in particular LEDs. In the embodiment shown in FIGS. 2 and 3, the light sources 10 are arranged on the side of the support plate 8 facing the rear wall 6 of the housing 4.

A reflector plate 12 is arranged between the support plate 8 and the rear wall 6 of the housing 4. A plurality of reflectors 14 facing the light sources 10 are formed within the reflector plate 12. As a result, light, which is emitted from the light sources 10, is reflected by the reflectors 14 to the light emitting front side of the exterior aircraft light unit 2. In the orientation of the exterior aircraft light unit 2 shown in FIGS. 2 and 3, the light emitting front side is the upper side. The number of reflectors 14 in particular corresponds with the number of light sources 10, i.e. a reflector 14 is associated with each light source 10, and vice versa.

The light sources 10 and the reflectors 14 may be arranged in a honeycomb structure, as it is illustrated in FIG. 2, on in any other structure which is suitable for generating the desired light distribution.

The support plate 8 is provided with windows/openings and/or formed at least partially transparent in order to allow the reflected light to pass through.

A heat sink 16, 20 is provided on the side of the support plate 8 which is opposite to the light sources 10.

The heat sink 16, 20 comprises a first heat sink portion 16 and a second heat sink portion 20. The first heat sink portion 16 is attached to the support plate 8 and/or the housing 4. The second heat sink portion 20 is selectively attachable to the first heat sink portion 16. Attaching the second heat sink portion 20 to the first heat sink portion 18 increases the cooling capacity of the heat sink 16, 20 by increasing the volume and the heat transfer surface of the heat sink 16, 20.

Figure 4:
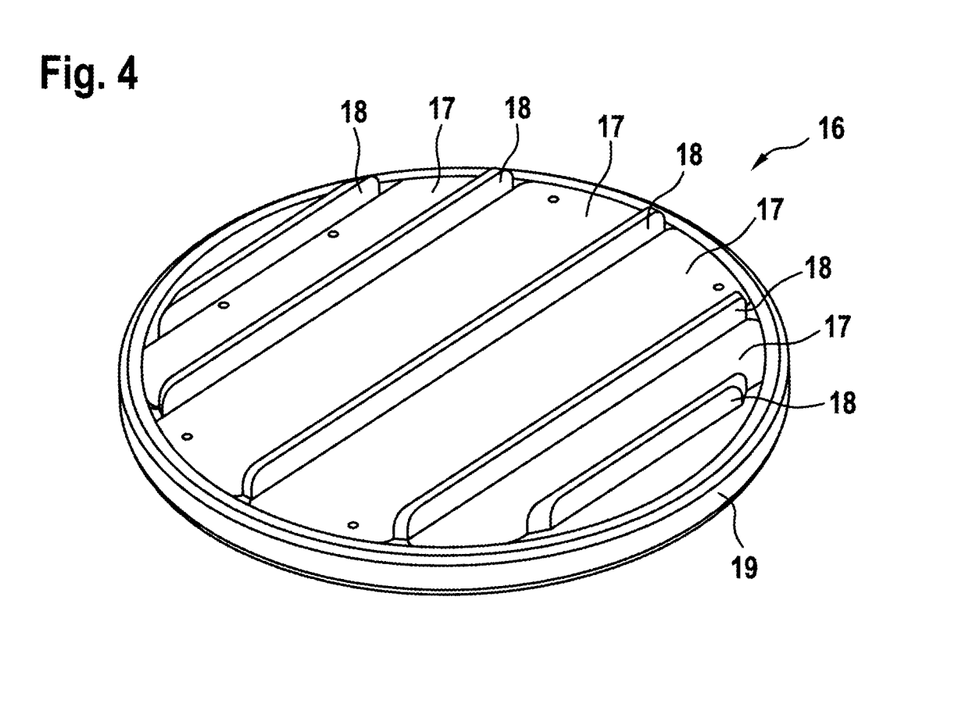
FIG. 4 shows a perspective view of a first heat sink portion of a heat sink according to an exemplary embodiment of the invention.
Figure 5:
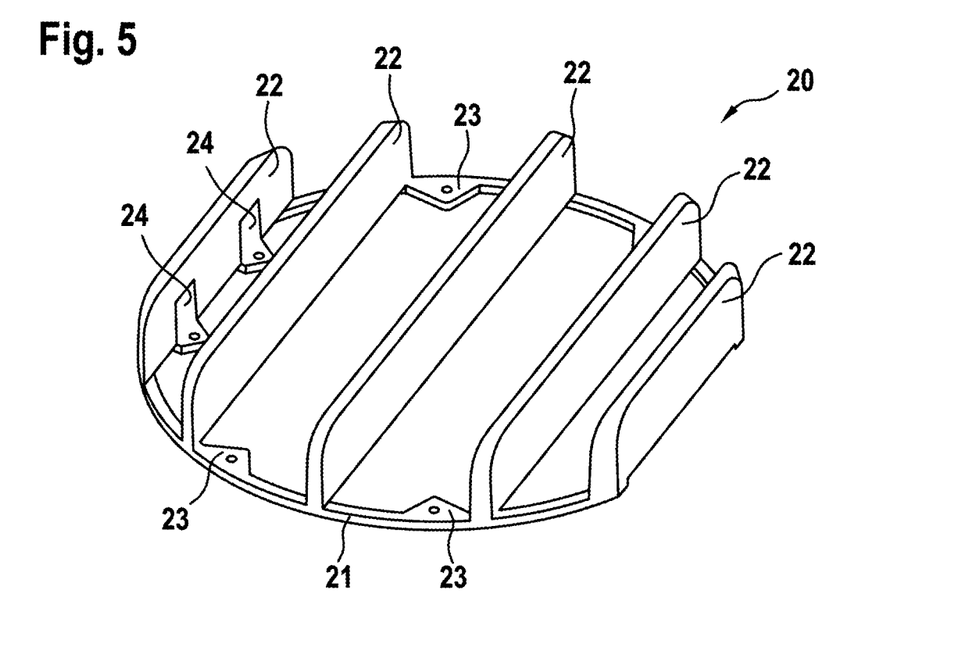
FIG. 5 shows a perspective view of a second heat sink portion of a heat sink according to an exemplary embodiment of the invention.
Figure 6:
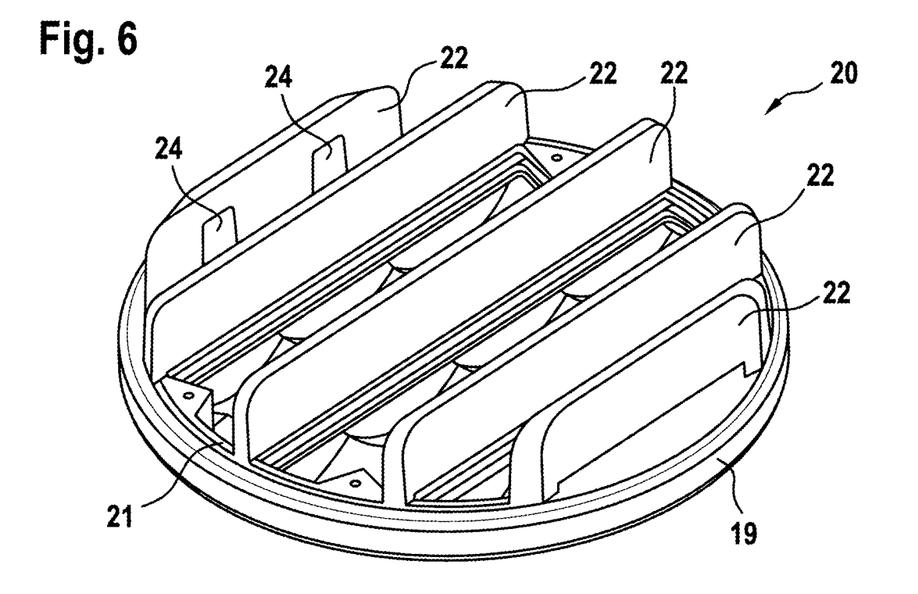
FIG. 6 shows a perspective view of a heat sink according to an exemplary embodiment of the invention in which the second heat sink portion is attached to the first heat sink portion.

FIG. 4 shows a perspective view of the first heat sink portion 16, FIG. 5 shows a perspective view of the second heat sink portion 20, and FIG. 6 shows a perspective view of the second heat sink portion 20 attached to the first heat sink portion 16.

The first heat sink portion 16 comprises a circular outer support ring 19 (first outer support ring 19), which is attached to the rim of the housing 4, when the first heat sink portion 16 is mounted thereto (cf. FIG. 3). The skilled person will understand that the shape and the diameter of the first outer support ring 19 are set to correspond with the upper rim of the housing 4.

A plurality of first cooling ribs 18 extend parallel to each other across the first support ring 19. A plurality of intermediate plates 17, which are at least partially transparent in order to allow emitted light to pass through, extend between the first cooling ribs 18.

The first cooling ribs 18 may have a height h1 of 5 mm to 10 mm, in particular in the range of 6 mm to 8 mm, more particular 7.5 mm (cf. FIG. 3).

The second heat sink portion 20 is basically formed similar to the first heat sink portion 16. The second heat sink portion 20 in particular also comprises an outer support ring 21 (second outer support ring 21) and a plurality of second cooling ribs 22 extending parallel to each other across the second outer support ring 21. The skilled person will understand that the shape and the diameter of the second outer support ring 21 are set to correspond with the first outer support ring 19.

The diameter of the second outer support ring 21 in particular is set so that the outer support ring 21 of the second heat sink portion 20 may be positioned over the first support ring 19, as it is shown in FIG. 3. The second outer support ring 21 may be at least partly made of a flexible material in order to allow compensating for manufacturing tolerances of the housing 4 and/or the first heat sink portion 18.

The height of the second cooling ribs 22 may be the same as the height h1 of the first cooling ribs 18, or it may be different. In the exemplary embodiment shown in the figures, the height of the second cooling ribs 22 is larger than the height h1 of the first cooling ribs 18. The height of the second cooling ribs 22 in particular may be set so that the combined height h1+2 of the first and second cooling ribs 18, 22 is in the range of 30 mm to 50 mm; in particular in the range of 35 mm to 45 mm, and more particular 45 mm (cf. FIG. 3).

The second cooling ribs 22 of the second heat sink portion 20 are positioned in correspondence with the positions of the first cooling ribs 18 of the first heat sink portion 16.

Channels or grooves 25 are formed in the (lower) sides of the second cooling ribs 22 facing the first cooling ribs 17. As a result, (upper) tip portions of the first cooling ribs 18 may be introduced into said channels or grooves 25 for attaching the second heat sink portion 20 to the first heat sink portion 16 (cf. FIG. 3) and providing an efficient and reliable connection between the first and second heat sink portions 16, 20.

As can be seen from FIGS. 4 and 5 as well as from FIG. 2, the first heat sink portion 16 and the second heat sink portion 20 have aligned fastening holes. Accordingly, fasteners, such as pins or bolts or screws, can be inserted through the aligned fastening holes for attaching the first and second heat sink portions 16, 20 to each other and to the housing 4. Also, the same fasteners may be used for only attaching the first heat sink portion 16 to the housing 4. By choosing the length of the fasteners accordingly, they may be used in both scenarios, namely for attaching the first heat sink portion 16 only and for attaching both the first heat sink portion 16 and the second heat sink portion 20, thus eliminating the need for different fasteners in different application scenarios.

Figure 7:
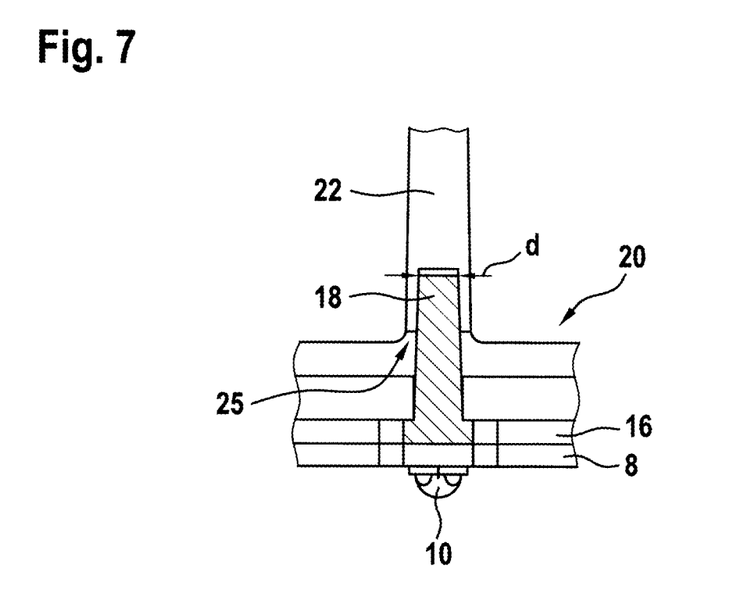
FIG. 7 shows an enlarged detail of FIG. 3 illustrating the interaction between the first and second cooling ribs.

FIG. 7 shows an enlarged detail of FIG. 3 illustrating the interaction between the first and second cooling ribs 18, 22.

The channels or grooves 25 formed in the second cooling ribs 22 and/or the upper portions of the first cooling ribs 18 in particular may be tapered, i.e. the upper tip portions of the first cooling ribs 18 may have a smaller width d than the base portions of the first cooling ribs 18. Similarly, the channels or grooves 25 formed within the second heat sink portion 20 may be wider at their open outer sides facing the first heat sink portion 16 than at the opposing closed ends of the channels or grooves 25.

Tapering the first cooling ribs 18 and/or channels or grooves 25 allows to compensate for tolerances in manufacturing and results in a tight and secure connecting between the first and second heat sink portions 16, 20. It further enlarges the area of contact between the first and second cooling ribs 18, 22 resulting in an increased transfer of heat from the first heat sink portion 16 to the second heat sink portion 20.

Optionally, an additional heat transfer medium, such as a heat transfer paste, may be provided between the first and second heat sink portions 16, 20 in order to enhance the transfer of heat even further.

The second outer support ring 21 comprises a plurality of fastening lugs 23. The fastening lugs 23 allow to securely fix the second heat sink portion 20 to the first heat sink portion 16 by appropriate fastening elements such as bolts or screws, which are not shown in the figures. Additional fastening lugs 24 may be provided at the second cooling ribs 22.

At least one of the first and second heat sink portions 16, 20 may be die-casted or machined from an extruded metal having a high thermal conductivity, such as Aluminum.

In the embodiment shown in the figures, the first and second cooling ribs 18, 22 extend parallel to the main direction of light emission of the exterior aircraft light unit 22. As a result, the first and second cooling ribs 18, 22 basically do not obstruct or block the light emitted by the exterior aircraft light unit 2 and therefore do not deteriorate the efficiency of the exterior aircraft light unit 2.

Alternatively or additionally, first and second heat sink portions, which are configured similar to the first and second heat sink portions 16, 20 shown in the figures, may be attached to the rear side of the reflectors 14 for dissipating heat from the reflectors 14, in particular for dissipating heat from the reflectors 14 that originally stems from the light sources 10.

A heat sink 16, 20 according to an exemplary embodiment of the invention comprising two portions 16, 20, which may be selectively attached to and separated from another, allows to flexibly adjust the cooling capacity of the heat sink 16, 20 to the actual needs.

In case the exterior aircraft light unit 2 is operated with relatively small power, a small cooling capacity of the heat sink 16, 20 is sufficient. Thus, only a first heat sink portion 16 is mounted to the exterior aircraft light unit 2. As a result, the exterior aircraft light unit 2 has a small size and needs only a relatively small mounting space.

In case the exterior aircraft light unit 2 is to be operated with more power, more cooling capacity is needed. Thus, a second heat sink portion 20 is mounted to the first heat sink portion 16 providing a cooling booster which increases the cooling capacity of the heat sink 16, 20.

Increasing the cooling capacity of the heat sink 16, 20 in particular is beneficial when the power of the exterior aircraft light unit 2 is above 10 W, as it is usually the case for landing lights, take-off lights, taxi lights, runway turn-off lights and multi-functional light units providing at least two of the functionalities of a landing lights, a take-off light, a taxi light, and a runway turn-off light.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An exterior aircraft light unit comprising:
    a housing including a mounting portion, which is configured for mounting the aircraft light unit to an aircraft;
    at least one light source supported by the housing; and
    a heat sink;
    wherein the heat sink comprises:
    at least one first heat sink portion, which is mounted to the housing and thermally connected with the at least one light source for transferring heat from the at least one light source to the at least one first heat sink portion; and
    at least one second heat sink portion, which is configured to be selectively attachable to the at least one first heat sink portion,
    wherein the at least one first heat sink portion comprises first support ring and a plurality of first cooling ribs extending across the first support ring.

2. An exterior aircraft light unit according to claim 1, wherein the at least one second heat sink portion comprises a plurality of channels or grooves which are configured for receiving corresponding first cooling ribs when the second heat sink portion is attached to the at least one first heat sink portion.

3. An exterior aircraft light unit according to claim 2, wherein at least some of the first cooling ribs and the corresponding channels or grooves of the at least one second heat sink portion are tapered.

4. An exterior aircraft light unit according to claim 2, wherein the at least one second heat sink portion comprises a plurality of second cooling ribs, wherein in particular each channel or groove is associated with a corresponding second cooling rib.

5. An exterior aircraft light unit according to claim 1, wherein the first cooling ribs extend parallel to each other.

6. An exterior aircraft light unit according to claim 1, wherein the support ring is attached to the housing of the exterior aircraft light unit.

7. An exterior aircraft light unit according to claim 1, wherein the second cooling ribs extend across a second support ring, which in particular is at least partly flexible.

8. An exterior aircraft light unit comprising:
a housing including a mounting portion, which is configured for mounting the aircraft light unit to an aircraft;
at least one light source supported by the housing; and
a heat sink;
wherein the heat sink comprises:
at least one first heat sink portion, which is mounted to the housing and thermally connected with the at least one light source for transferring heat from the at least one light source to the at least one first heat sink portion; and
at least one second heat sink portion, which is configured to be selectively attachable to the at least one first heat sink portion,
wherein the at least one first heat sink portion comprises a plurality of first cooling ribs,
wherein the first cooling ribs have a height ($h_1$) of 5 mm to 10 mm.

9. An exterior aircraft light unit according to claim 1, wherein the at least one light source and the at least one first heat sink portion are attached to a common support, in particular to a printed circuit board.

10. An exterior aircraft light unit according to claim 1, wherein the heat sink is arranged on a light emitting front side of the aircraft light unit, wherein the first cooling ribs extend parallel to a direction of main light emission of the exterior aircraft light unit.

11. An exterior aircraft light unit according to claim 1, wherein the second heat sink portion is attachable to the aircraft light unit with no additional parts needed beyond those used to assemble the aircraft light unit with only the first heat sink portion attached.

12. An exterior aircraft light unit according to claim 1, wherein the aircraft light unit is operated with an electrical power of more than 10 W.

13. An aircraft, comprising at least one exterior aircraft light unit according to claim 1.

14. A set comprising
a housing of an exterior aircraft light unit with a mounting portion, which is configured for mounting the housing to an aircraft;
at least one first heat sink portion mounted to the housing and comprising a first support ring and a plurality of first cooling ribs extending across the first support ring; and
at least one second heat sink portion, which is configured to be selectively attachable to the at least one first heat sink portion for providing a heat sink having an increased cooling capacity;
wherein the housing is configured to support at least one light source so that the at least one light source is thermally connected with the at least one first heat sink portion for transferring heat from the at least one light source to the at least one first heat sink portion.

15. An exterior aircraft light unit according to claim 1, wherein the second cooling ribs extend parallel to each other.

16. An exterior aircraft light unit according to claim 1, wherein the first and second cooling ribs extend parallel to each other.

17. An exterior aircraft light unit according to claim 1, wherein the first cooling ribs have a height ($h_1$) in the range of 6 mm to 8 mm.

18. An exterior aircraft light unit according to claim 1, wherein the combined height ($h_{1+2}$) of the first and second cooling ribs is in the range of 30 mm to 50 mm.

19. An exterior aircraft light unit according to claim 1, wherein the heat sink is arranged on a light emitting front side of the aircraft light unit, and wherein the second cooling ribs extend parallel to a direction of main light emission of the exterior aircraft light unit.

20. An exterior aircraft light unit according to claim 1, wherein the aircraft light unit is at least one of a landing light unit, a take-off light unit, a taxi light unit, a runway turn-off light unit and a multi-functional light unit providing at least two of the functionalities of a landing light unit, a take-off light unit, a taxis light unit, and a runway turn-off light unit.

* * * * *